(12) United States Patent
Liu et al.

(10) Patent No.: US 6,982,101 B2
(45) Date of Patent: Jan. 3, 2006

(54) SWEETENED NUT BUTTER SPREAD AND METHOD FOR ITS PRODUCTION

(75) Inventors: Linsen Liu, Irvine, CA (US); Ronald B. Swain, Placentia, CA (US)

(73) Assignee: ConAgra Grocery Products Company, Irvine, CA (US)

( * ) Notice: Subject to any disclaimer, the term of this patent is extended or adjusted under 35 U.S.C. 154(b) by 193 days.

(21) Appl. No.: 10/278,543

(22) Filed: Oct. 23, 2002

(65) Prior Publication Data

US 2004/0081744 A1   Apr. 29, 2004

(51) Int. Cl.
A23L 1/38   (2006.01)

(52) U.S. Cl. .............. 426/633; 426/519; 426/601; 426/639; 426/650; 426/658

(58) Field of Classification Search ........... 426/633, 426/639, 601, 650, 658, 519
See application file for complete search history.

(56) References Cited

U.S. PATENT DOCUMENTS

| | | | |
|---|---|---|---|
| 1,158,297 A | 10/1915 | Boot | |
| 1,890,180 A | 12/1932 | Hoffman | |
| 2,079,288 A | 5/1937 | Hoffman | |
| 3,044,883 A | 7/1962 | Ferguson, Jr. | |
| 3,619,207 A | 11/1971 | Dzurik et al. | |
| 3,749,587 A | 7/1973 | Billerbeck et al. | |
| 3,821,448 A * | 6/1974 | Parker et al. | 426/397 |
| 3,903,311 A | 9/1975 | Billebeck et al. | |
| 3,978,246 A | 8/1976 | Chozianin | |
| 3,995,068 A | 11/1976 | Billerbeck et al. | |
| 4,000,322 A | 12/1976 | Billerbeck et al. | |
| 4,062,986 A | 12/1977 | Billerbeck et al. | |
| 4,152,466 A | 5/1979 | Deretchin | |
| 4,973,491 A | 11/1990 | Shin et al. | |
| 5,079,027 A | 1/1992 | Wong et al. | |
| 5,591,477 A | 1/1997 | Boyce et al. | |
| 5,667,838 A | 9/1997 | Wong et al. | |
| 5,714,193 A | 2/1998 | Fix et al. | |
| 5,876,781 A | 3/1999 | Lasdon et al. | |
| 5,885,645 A | 3/1999 | Wong et al. | |
| 5,885,646 A | 3/1999 | Wong et al. | |
| 6,063,430 A | 5/2000 | Wong | |
| 6,623,783 B1 * | 9/2003 | Wong et al. | 426/633 |

* cited by examiner

*Primary Examiner*—Helen Pratt
(74) *Attorney, Agent, or Firm*—Bingham McCutchen LLP

(57) ABSTRACT

Disclosed is an improved sweetened nut butter spread having a desirable flavor and smooth texture. The sweetened nut butter spread is prepared by grinding nuts and/or oil seeds in the presence of an edible oil to form a nut paste containing ground nuts and/or oil seeds and edible oil. A sweetening composition comprising sugar is added to the nut paste to form a sweetened nut paste, and the sweetened nut paste is comminuted to form a ground sweetened nut paste. A liquid flavoring agent, such as honey or molasses, is added to the ground sweetened nut paste to form a sweetened nut butter spread. Crunchy particles can be further added to make crunchy nut butter spread.

52 Claims, No Drawings

SWEETENED NUT BUTTER SPREAD AND METHOD FOR ITS PRODUCTION

BACKGROUND OF THE INVENTION

Peanut butter and other nut butter spreads are very popular to consumers. In particular, consumers desire a sweet, flavorful spread. To this end, attempts have been made to include honey, molasses and other more viscous sweet ingredients in nut butter spreads. Current methods for incorporating these ingredients into the nut butter involve mixing the sugar and honey at the same time into the nut paste, which may or may not contain other seasonings and/or stabilizers. Unfortunately, sugar solids and honey can increase the viscosity of nut paste dramatically. At high concentrations, such as 10% sugar and 5% honey, the texture of the mixture becomes dough-like or cake-like instead of being the desired smooth liquid paste. Such a mixture is very difficult to process mechanically and pump through pipelines. As a result, commercially-produced nut butters such as honey roasted peanut butter typically only contain a small amount of sugar solids (around 2%).

Attempts have been made to address this problem. For example, in U.S. Pat. No. 3,903,311, Billerbeck et al. describe a method for incorporating honey into a nut butter spread. According to Billerbeck's method, roasted peanuts are mixed with sugar and salt to form a dry peanut composition. The peanut composition is milled with peanut oil to form a milled mixture. The milled mixture is heated, and heated honey is blended with the milled mixture to produce the desired sweetened butter composition.

Although Billerbeck's method maybe suitable when the amount of sugar is limited to 5 wt. % or less, as disclosed in the '311 patent, the present inventors have discovered that increasing the amount of sugar in Billerbeck's method can produce undesirable results. In particular, it has been found that sugar accumulates in the dry mixer and, as the relative amount of sugar increases, it has a tendency to caramelize in the mixer. The extraneous sugar, salt and peanut dust enters the motor, and the caramelization of the sugar can cause the motor to seize, thereby requiring that the mixer be shut down and cleaned. As the ratio of sugar to peanut dust increases, caramelization is more likely.

SUMMARY OF THE INVENTION

To address the above-described concerns, the inventors have developed an improved sweetened nut butter spread and an improved method for making the sweetened nut butter spread.

In one embodiment, the invention is directed to a method for making a sweetened nut butter spread. The method comprises grinding nuts and/or oil seeds in the presence of an edible oil to form a nut paste containing ground nuts and/or oil seeds and edible oil. A sweetening composition comprising at least one sugar is added to the nut paste to form a sweetened nut paste. The sweetened nut paste is comminuted to form a ground sweetened nut paste. At least one liquid flavoring agent, such as honey or molasses, is added to the ground sweetened nut paste to form a sweetened nut butter spread. Addition of the honey to the ground sweetened nut paste results in a product that is smooth and easy to mechanically process and pump, even when the sugar concentration exceeds 10% or more. Moreover, the addition of the sugar to the nut paste rather than to the dry ground nuts minimizes any manufacturing difficulties due to potential caramelization of the sugar in the mixer, even with increased sugar concentrations.

In another embodiment, the invention is directed to a sweetened nut butter spread. The sweetened nut butter spread comprises nuts and/or oil seeds in a total amount ranging from about 60 wt. % to about 80 wt. %; at least one edible oil in a total amount ranging from about 1 wt. % to about 15 wt. %; at least one sugar in a total amount of at least about 7 wt. %; at least one salt in a total amount ranging from about 0.3 wt. % to about 3 wt. %; at least one stabilizer in a total amount up to about 4 wt. %; and at least one liquid flavoring agent in a total amount of at least about 0.5 wt. %. All amounts are based on the total weight of the sweetened nut butter spread.

In still another embodiment the invention is directed to a sweetened nut butter spread comprising peanuts in a total amount ranging from about 65 wt. % to about 75 wt. %; peanut oil in a total amount ranging from about 3 wt. % to about 7 wt. %; at least one sugar in a total amount ranging from about 12 wt. % to about 25 wt. %; at least one salt in a total amount ranging from about 0.5 wt. % to about 1.5 wt. %; at least one stabilizer in a total amount up to about 3 wt. %; and honey in a total amount of at least about 0.5 wt. %. All amounts are based on the total weight of the sweetened nut butter spread.

DETAILED DESCRIPTION

Nut butter products are spreadable food products made from nut pastes. Nut butter products include peanut butter and peanut spread, as these terms are defined by the standards of identity of the U.S. Food and Drug Administration.

The nut pastes useful in accordance with the invention are formed from any suitable nut or oil seed. Representative nuts include peanuts, almonds, pecans, and walnuts. Representative oil seeds include sunflower seeds, sesame seeds, pumpkin seeds and soybeans. Mixtures of such nuts and oil seeds can also be used in accordance with the invention. Unless otherwise indicated, the use of the term "nut" herein is intended to encompass both nuts and oil seeds.

The nuts are preferably first roasted to generate nuts with a pleasant roasting flavor, as is generally known in the art. Roasting is preferably accomplished in a continuous roaster at a temperature ranging from about 270° F. to about 370° F. The roasted nuts are preferably cooled to a temperature below about 150° F., more preferably below about 130° F., still more preferably below about 120° F., before being further processed. If desired, prior to being ground, the roasted nuts can be blanched to remove the seed coat and/or color-sorted as is generally known in the art.

The blanched and roasted nuts are then ground in any suitable apparatus by any suitable method to make ground nuts. Suitable grinding mills for use in connection with the invention are commercially available from Andritz Sprout Bauer Inc. (Munch, Pa.) and Urschel Laboratories, Inc. (Valparaiso, Ind.). Alternatively, a roll mill can be employed. The fineness of the ground nuts can be measured using a peanut butter gauge bar graduated from 0 to 20 mils and scraper manufactured by Precision Gauge and Tool Company (Dayton, Ohio). Preferably the nuts are ground to a fineness less than 30 mils, more preferably less than 20 mils, still more preferably about 13 mils. The nuts are preferably ground at a temperature ranging from ambient temperature to about 165° F., more preferably from about 90° F. to about 155° F., still more preferably from 100° F. to 120° F. The am of ground nuts in the final product preferably ranges from about 50 wt. % to about 90 wt. %, more preferably from about 60 wt. % to about 80 wt. %, still more preferably from about 65 wt. % to about 75 wt. %, based on the total weight of the final product.

Typically the nuts are ground in the presence of an edible oil to improve the smoothness of the finished product. Suitable edible oils for use in the invention include those of plant-origin, such as peanut oil, soybean oil, canola oil, sunflower oil, safflower oil, palm oil, cottonseed oil, coconut oil, walnut oil and mixtures thereof. For peanut butter products, the preferred edible oil is peanut oil. The edible oil can also be a low calorie or zero calorie oil. Suitable low calorie or zero calorie edible oils include sucrose polyesters of long chain fatty acids (olestra) and other polyol polyesters of fatty acids, such as those described in U.S. Pat. No. 3,600,186 to Mattson and U.S. Pat. No. 4,005,196 to Jandacek (the disclosures of which are incorporated herein by reference), oils containing at least 10% medium chain triglycerides, such as are described in U.S. Pat. No. 4,863,753 to Hunter (the disclosure of which is incorporated herein by reference), and mixed triglycerides made from medium and long chain saturated and/or unsaturated fatty acids. The total amount of edible oil in the final product preferably ranges from about 1 wt. % to about 15 wt. %, more preferably from about 2 wt. % to about 12 wt. %, still more preferably from about 3 wt. % to about 9 wt. %.

The edible oil is introduced into the mill or grinder with the nuts during grinding. The ground nuts and edible oil are ground together for a sufficient time to create a nut paste. Alternatively, the edible oil can be mixed with the ground nuts after grinding is complete, preferably for about 20 to 30 minutes. The temperature of the nut paste is preferably maintained at a temperature greater than 100° F. to avoid the mixture from becoming too thick to mix and pump effectively.

A sweetening composition is then added to the nut paste to form a sweetened nut paste. The sweetening composition comprises at least one sugar. As used herein, the term "sugar" refers to a dry mono- or di-saccharide-containing composition having a moisture content less than about 10 wt. %. preferably less than about 5 wt. %. Examples of suitable sugars for use in the present invention include sucrose, fructose, dextrose, lactose, maltose, dry honey, corn syrup solids, high fructose corn syrup solids, and maltose syrup solids. Particularly preferred sugars are sucrose and high fructose corn syrup solids. The total amount of sugar in the final nut butter product is preferably at least about 7 wt. %, more preferably from about 10 wt. % to about 30 wt. %, still more preferably from about 12 wt. % to about 25 wt. %, based on the total weight of the final product.

If desired, the sweetening composition can also contain one or more artificial sweeteners. Examples of suitable artificial sweeteners for use in the invention include aspartame, acesuflam, saccharine, cyclamate and glycyrrhizin. The amount of artificial sweetener used will depend on the sweetness intensity of the particular artificial sweetener, as is generally known to those skilled in the art.

The sweetening composition preferably also comprises salt. As used herein, the term "salt" includes salt and salt substitutes, such as sodium chloride, potassium chloride, seasoned salts, and mixtures thereof. The total amount of salt in the final product preferably ranges from about 0.3 wt. % to about 3 wt. %, more preferably from about 0.5 wt. % to about 1.5 wt. %, based on the total weight of the final product.

The sweetening composition preferably also includes a stabilizer to prevent separation of the solid and edible oil phases. Suitable stabilizers are known in the art and include hydrogenated vegetable oils and their derivatives, such as mono- and diglycerides. Suitable stabilizers are disclosed, for example, in U.S. Pat. No. 4,996,074 to Seiden, the disclosure of which is incorporated herein by reference. The stabilizers generally are saturated triglycerides, monoglycerides, diglycerides and mixtures thereof that are solid at room temperature and have an iodine value of less than 8. They solidify in the nut butter in specific crystalline states and keep the edible oil from separating. Such materials can be combined with a second vegetable oil or hydrogenated oil, for example, hydrogenated palm oil, canola oil, soybean oil, rapeseed oil, cottonseed oil, coconut oil or the like. Such materials can also be combined with lower melting fat fractions, such as the peanut butter stabilizer disclosed in U.S. Pat. No. 4,341,814, the disclosure of which is incorporated herein by reference. For peanut butter products, preferred stabilizers include hydrogenated rapeseed oil, hydrogenated cottonseed oil, fractionated and/or hydrogenated palm stearin, and other hydrogenated oils having a high proportion of fatty acids containing between sixteen and twenty-two carbon atoms. Such stabilizers are disclosed in U.S. Pat. Nos. 3,597,230 and 3,192,102, the disclosures of which are incorporated herein by reference. The stabilizer is preferably included in an amount up to about 4 wt. %, more preferably up to about 3 wt. %, based on the total weight of the final product.

The components of the sweetening composition are added to and comminuted with the nut paste, preferably by milling or grinding, to produce a ground sweetened nut paste. If desired, one or more components of the sweetening composition can be mixed together prior to addition to the nut paste. Preferably the sweetening composition and nut paste are agitated for at least 10 minutes at a temperature ranging from about 120° F. to about 180° F., more preferably at a temperature ranging from about 130° F. to about 160° F. Thereafter, the sweetened nut paste is finely ground to further reduce the particle size to produce a product with a smooth texture. The average particle size preferably ranges from about 2 mil to about 5 mil.

One or more liquid flavoring agents are then added to the finely ground sweetened nut paste to produce a flavored sweet nut butter spread. As used herein, the term "liquid flavoring agent" refers to a flavoring agent in liquid form and having a water activity less than 0.65, preferably less than 0.60, at a temperature ranging from about 40 to about 100° F. (about 4 to about 37° C.). Examples of suitable liquid flavoring agents include honey, molasses, and syrups, such as maple syrup, corn syrup, maltose syrup, high fructose corn syrup, or liquid sucrose. The honey can be added at ambient or elevated temperature. The amount of liquid flavoring agent added is preferably at least about 0.5 wt. %, more preferably from about 2 wt. % to about 30 wt. %, still more preferably from about 3 wt. % to about 15 wt. %, based on the total weight of the final product.

The flavored sweet nut butter spread can then be introduced directly into containers for sale to the consumer. Alternatively, the flavored sweet nut butter spread can be homogenized to further reduce the particle size and create a smoother texture, as is generally known in the art. Preferably the flavored sweet nut butter spread, with or without homogenization, is cooled to a temperature ranging from about 80° F. to about 105° F. before being introduced into containers.

If desired, the flavored sweet nut butter spread can be used to make a crunchy nut spread product. In such an instance, nut particles, which preferably have been roasted or oil fried, with or without sugar coating, are mixed with the flavored sweet nut butter spread. The amount of nut particles added depends on the desired texture, but preferably is at least about 5 wt. %, and more preferably ranges from about 10 wt. % to about 25 wt. %, based on the total weight of the final product. The nut particles preferably have a size such that at least about 90% of the nuts can pass through a US Sieve # 3½ (5.6 mm) but be retained on a US Sieve #10(2.0 mm). Advantageously, the present method produces a sweetened nut butter spread of desired flavor and texture without the use of an emulsifier. If desired, an emulsifier such as a mono- or diglyceride (solid emulsifiers), or a sucrose ester or lecithin (liquid emulsifiers), can be included in the sweet nut butter spread of the invention, although the use of an emulsifier is economically undesirable, and thus an emulsifier, and more particularly a liquid emulsifier, is preferably not included.

EXAMPLES

Example 1

Creamy-type sweetened peanut butter spreads were prepared having the following compositions, where the amounts are indicated as a weight percentage based on the total weight of the composition:

|  | 1A | 1B | 1C | 1D | 1E |
|---|---|---|---|---|---|
| Peanut | 64.0 | 64.6 | 75.3 | 76.7 | 70.0 |
| Peanut oil | 10.1 | 9.1 | 5.2 | 5.2 | 4.9 |
| Honey | 13.2 | 8.6 | 9.0 | 3.6 | 3.6 |
| Sugar[1] | 9.4 | 14.3 | 7.0 | 10.2 | 17.2 |
| Molasses | 0.9 | 1.0 | 1.0 | 1.3 | 1.3 |
| Salt | 1.0 | 1.0 | 1.0 | 1.0 | 1.0 |
| Stabilizer[2] | 1.4 | 1.4 | 1.5 | 2.0 | 2.0 |

[1]Imperial Powdered Sugar (Imperial Sugar Co., Savannah Georgia)
[2]Blend of hydrogenated cottonseed and rapeseed oil with an iodine value of 40 or less The sweetened peanut butter spread was prepared by first roasting and blanching the peanuts and then grinding them to less than about 13 mil. As the peanuts were being ground, the peanut oil was added to create a peanut paste, which was maintained at or above 133° F. to avoid the mixture being too thick to mix well and pump. The sugar and starch were blended together and then added to the ground peanut paste along with the salt and the stabilizer. These ingredients were mixed for about 10 minutes at a temperature of about 130° F. to about 140° F. The paste was then finely ground to 3.5+mil. The honey and molasses were then added to the finely milled paste, which was maintained at a temperature of about 150° F. to about 160° F. The product was cooled to about 140° F. to about 150° F. and then homogenized to produce a creamy sweetened peanut butter spread. The finished products had textures ranging from 3 to 8 as measured by a TA 2 Texture Analyzer (Texture Technologies Corporation, Scarsdale N.Y.) after 48 hours of aging at ambient temperature.

Example 2

Crunchy sweetened peanut butter spreads were prepared using roasted particles and having the following compositions:

|  | 2A | 2B | 2C | 2D | 2E |
|---|---|---|---|---|---|
| Peanut | 54.4 | 54.9 | 64.0 | 61.3 | 56.1 |
| Peanut oil | 8.6 | 7.9 | 4.2 | 4.3 | 3.9 |
| Honey | 11.2 | 7.3 | 7.7 | 2.9 | 2.9 |
| Sugar | 8.0 | 12.1 | 6.0 | 8.1 | 13.7 |
| Molasses | 0.8 | 0.8 | 0.9 | 1.0 | 1.0 |
| Salt | 0.8 | 0.8 | 0.9 | 0.8 | 0.8 |
| Stabilizer | 1.2 | 1.2 | 1.3 | 1.6 | 1.6 |
| Roasted Crunchy | 15.0 | 15.0 | 15.0 | 20.0 | 20.0 |

The crunchy peanut particles were added to the creamy sweetened peanut butter spreads produced as generally described in Example 1 in the amounts indicated. The finished products all had textures ranging from 3 to 8 after 48 hrs of aging at ambient temperature.

Example 3

Crunchy sweetened peanut butter spreads were prepared using oil-fried peanut particles and having the following compositions:

|  | 3A | 3B | 3C |
|---|---|---|---|
| Peanut | 52.5 | 66.2 | 67.5 |
| Peanut oil | 8.3 | 4.6 | 4.7 |
| Honey | 10.8 | 7.9 | 3.2 |
| Sugar | 7.6 | 6.2 | 8.9 |
| Molasses | 0.8 | 0.9 | 1.0 |
| Salt | 0.8 | 0.9 | 0.9 |
| Stabilizer | 1.2 | 1.3 | 1.8 |
| Sugar coated crunchy | 18.0 | 12.0 | 12.0 |

The crunchy peanut particles were added to the creamy sweetened peanut butter spreads produced as generally described in Example 1 in the amounts indicated. The finished products all had textures ranging from 3 to 8 after 48 hrs of aging at ambient temperature.

The preceding description has been presented with reference to presently preferred embodiments of the invention. Workers skilled in the art and technology to which this invention pertains will appreciate that alterations and changes in the described products and methods may be practiced without meaningfully departing from the principal, spirit and scope of this invention. Accordingly, the foregoing description should not be read as pertaining only to the precise products and methods described, but rather should be read consistent with and as support to the following claims which are to have their fullest and fair scope.

What is claimed is:

1. A method for making a sweetened nut butter spread comprising:
    grinding nuts and/or oil seeds in the presence of an edible oil to form a nut paste containing ground nuts and/or oil seeds and edible oil;
    adding to the nut paste a sweetening composition comprising at least one sugar to form a sweetened nut paste;
    comminuting the sweetened nut paste to form a ground sweetened nut paste; and
    adding at least one liquid flavoring agent to the ground sweetened nut paste to form a sweetened nut butter spread, the at least one liquid flavoring agent being added after the steps of grinding nuts and/or oil seeds, adding the sweetening composition, and comminuting the sweetened nut paste, wherein a total amount of the liquid flavoring agent ranges from about 3 wt. % to about 30 wt. % based on the total weight of the sweetened nut butter spread.

2. The method of claim 1, wherein the total amount of nuts in the sweetened nut butter spread ranges from about 60 wt. % to about 80 wt. %, based on the total weight of the final product.

3. The method of claim 1, wherein the edible oil is selected from the group consisting of peanut oil, soybean oil, canola oil, corn oil, sunflower oil, safflower oil, palm oils, cottonseed oil, coconut oil, walnut oil and mixtures thereof.

4. The method of claim 1, wherein the total amount of edible oil in the sweetened nut butter spread ranges from about 1 wt. % to about 15 wt. %, based on the total weight of the final product.

5. The method of claim 1, wherein the total amount of edible oil in the sweetened nut butter spread ranges from about 2 wt. % to about 12 wt. %, based on the total weight of the final product.

6. The method of claim 1, wherein the total amount of edible oil in the sweetened nut butter spread ranges from about 3 wt. % to about 9 wt. %, based on the total weight of the final product.

7. The method of claim 1, wherein the total amount of sugar added to the nut paste is at least about 7 wt. %, based on the total weight of the final product.

8. The method of claim 1, wherein the total amount of sugar added to the nut paste ranges from about 10 wt. % to about 30 wt. %, based on the total weight of the final product.

9. The method of claim 1, wherein the total amount of sugar added to the nut paste ranges from about 12 wt. % to about 25 wt. %, based on the total weight of the final product.

10. The method of claim 1, wherein the at least one sugar is selected from the group consisting of sucrose, fructose, dextrose, lactose, maltose, dry honey, corn syrup solids, high fructose corn syrup solids, and maltose syrup solids.

11. The method of claim 1, wherein the sweetening composition further comprises at least one salt.

12. The method of claim 11, wherein the total amount of salt added to the nut paste ranges from about 0.3 wt. % to about 3 wt. %, based on the total weight of the final product.

13. The method of claim 11, wherein the total amount of salt added to the nut paste ranges from about 0.5 wt. % to about 1.5 wt. %, based on the total weight of the final product.

14. The method of claim 1, wherein the sweetening composition further comprises at least one artificial sweetener.

15. The method of claim 1, wherein the sweetening composition further comprises at least one stabilizer.

16. The method of claim 15, wherein the at least one stabilizer is selected from the group consisting of saturated triglycerides, monoglycerides and diglycerides.

17. The method of claim 15, wherein the total amount of stabilizer added to the nut paste is no more than about 4 wt. %, based on the total weight of the final product.

18. The method of claim 1, wherein the comminuting produces a ground sweetened nut paste having a fineness below about 15 mils.

19. The method of claim 1, wherein the at least one liquid flavoring agent is selected from the group consisting of honey, molasses, liquid sucrose, maple syrup, syrup, maltose syrup and high fructose corn syrup.

20. The method of claim 1, wherein the at least one liquid flavoring agent comprises honey.

21. The method of claim 20, wherein the total amount of honey added to the ground sweetened nut paste ranges from about 3 wt. % to about 15 wt. %, based on the total weight of the final product.

22. The method of claim 1, wherein the total amount of liquid flavoring agent added to the ground sweetened nut paste ranges from about 3 wt. % to about 15 wt. %, based on the total weight of the final product.

23. The method of claim 1, further comprising homogenizing the sweetened nut butter spread after addition of the at least one liquid flavoring agent.

24. The method of claim 1, further comprising adding crunchy/chunk nut particles to the sweetened nut butter spread to produce a crunchy/chunk nut butter spread.

25. The method of claim 24, wherein the crunchy/chunk nut particles are added in an amount ranging from about 10 wt. % to about 30 wt. %, based on the total weight of the final product.

26. The method of claim 1, wherein the sweetened nut butter spread does not contain a liquid emulsifier.

27. The method of claim 1, adding at least one liquid flavoring agent to the ground sweetened nut paste to form a sweetened nut butter spread comprising adding a flavoring agent in liquid form and having a water activity less than 0.65, at a temperature of about 40° F. to about 100° F.

28. A sweetened nut butter spread comprising: nuts and/or oil seeds in a total amount ranging from about 60 wt. % to about 80 wt. %; at least one edible oil in a total amount ranging from about 1 wt. % to about 15 wt. %; at least one sugar in a total amount of at least about 7 wt. %; at least one salt in a total amount ranging from about 0.3 wt. % to about 3 wt. %; at least one stabilizer in a total amount up to about 4 wt. %; and at least one liquid flavoring agent in a total amount of at least about 3 wt. %; wherein all amounts are based on the total weight of the sweetened nut butter spread.

29. The sweetened nut butter spread of claim 28, wherein the nuts and/or oil seeds are present in a total amount ranging from about 65 wt. % to about 75 wt. %, based on the total weight of the sweetened nut butter spread.

30. The sweetened nut butter spread of claim 28, wherein the at least one edible oil is selected from the group consisting of peanut oil, soybean oil, canola oil, corn oil, sunflower oil, safflower oil, palm oils, cottonseed oil, coconut oil, and walnut oil.

31. The sweetened nut butter spread of claim 28, wherein the at least one edible oil is present in a total amount ranging from about 2 wt. % to about 15 wt. %, based on the total weight of the sweetened nut butter spread.

32. The sweetened nut butter spread of claim 28, wherein the at least one edible oil is present in a total amount ranging from about 3 wt. % to about 9 wt. %, based on the total weight of the sweetened nut butter spread.

33. The sweetened nut butter spread of claim 28, wherein the at least one sugar is present in a total amount ranging from about 10 wt. % to about 30 wt. %, based on the total weight of the sweetened nut butter spread.

34. The sweetened nut butter spread of claim 28, wherein the at least one sugar is present in a total amount ranging from about 12 wt. % to about 25 wt. %, based on the total weight of the sweetened nut butter spread.

35. The sweetened nut butter spread of claim 28, wherein the at least one sugar is selected from the group consisting of sucrose, fructose, dextrose, lactose, maltose, dry honey, corn syrup solids, high fructose corn syrup solids, and maltose syrup solids.

36. The sweetened nut butter spread of claim 28, wherein the at least one salt is present in a total amount ranging from about 0.5 wt. % to about 2.0 wt. %, based on the total weight of the sweetened nut butter spread.

37. The sweetened nut butter spread of claim 28, wherein the at least one stabilizer is selected from the group consisting saturated triglycerides, monoglycerides and diglycerides.

38. The sweetened nut butter spread of claim 28, wherein the at least one stabilizer is present in a total amount up to about 3 wt. %, based on the total weight of the sweetened nut butter spread.

39. The sweetened nut butter spread of claim 28, wherein the at least one liquid flavoring agent is selected from the group consisting of honey, molasses, liquid sucrose, maple syrup, corny syrup, maltose syrup and high fructose corn syrup.

40. The sweetened nut butter spread of claim 28, wherein the at least one liquid flavoring agent is present in a total amount ranging from about 3 wt. % to about 30 wt. %, based on the total weight of the sweetened nut butter spread.

41. The sweetened nut butter spread of claim 28, wherein the at least one liquid flavoring agent is present in a total amount ranging from about 3 wt. % to about 15 wt. %, based on the total weight of the sweetened nut butter spread.

42. The sweetened nut butter spread of claim 28, wherein the at least one liquid flavoring agent comprises honey.

43. The sweetened nut butter spread of claim 42, wherein the honey is present in a total amount ranging from about 3 wt. % to about 30 wt. %, based on the total weight of the sweetened nut butter spread.

44. The sweetened nut butter spread of claim 28, wherein the sweetened nut butter spread does not contain a liquid emulsifier.

45. The sweetened nut butter spread of claim 28, further comprising crunchy/chunk nut particles in an amount ranging from about 10 wt. % to about 30 wt. % based on the total weight of the final product.

46. The sweetened nut butter spread of claim 28, the at least one liquid flavoring agent comprising a flavoring agent in liquid form and having a water activity less than 0.65, at a temperature of about 40° F. to about 100° F.

47. A sweetened nut butter spread comprising: peanuts in a total amount ranging from about 65 wt. % to about 75 wt. %; peanut oil in a total amount ranging from about 3 wt. % to about 7 wt. %, wherein the peanut oil is introduced into a mill or grinder during grinding of the peanuts; at least one sugar in a total amount ranging from about 12 wt. % to about 25 wt. %; at least one salt in a total amount ranging from about 0.5 wt. % to about 1.5 wt. %; at least one stabilizer in a total amount up to about 3 wt. %; and honey in a total amount of at least about 3 wt. %; wherein all amounts are based on the total weight of the sweetened nut butter spread.

48. The sweetened nut butter spread according to claim 47, wherein the sweetened nut butter spread further comprises molasses in a total amount ranging from about 1.0 wt. % to about 2.0 wt. %.

49. The sweetened nut butter spread of claim 47, further comprising crunchy/chunk nut particles in an amount ranging from about 10 wt. % to about 30 wt. % based on the total weight of the final product.

50. A method for making a sweetened nut butter spread comprising:
   introducing nuts and/or oil seeds;
   grinding the nuts and/or oil seeds;
   introducing an edible oil during grinding of the nuts and/or oil seeds to form a nut paste containing ground nuts and/or oil seeds and edible oil;
   adding to the nut paste a sweetening composition comprising at least one sugar to form a sweetened nut paste;
   comminuting the sweetened nut paste to form a ground sweetened nut paste; and
   adding at least one liquid flavoring agent to the ground sweetened nut paste to form a sweetened nut butter spread,
   the at least one liquid flavoring agent being added after the steps of introducing nuts and/or seeds, grinding the nuts and/or oil seeds, introducing the edible oil, adding the sweetening composition, and comminuting the sweetened nut paste.

51. The method of claim 50, the liquid flavoring agent being added after the grinding, adding and comminuting steps, wherein a total amount of the liquid flavoring agent ranges from about 3 wt. % to about 30 wt. % based on the total weight of the final product.

52. The method of claim 50, adding at least one liquid flavoring agent to the ground sweetened nut paste to form a sweetened nut butter spread comprising adding a flavoring agent in liquid form and having a water activity less than 0.65, at a temperature of about 40° F. to about 100° F.

* * * * *